US012434796B2

(12) United States Patent
L'Heureux

(10) Patent No.: US 12,434,796 B2
(45) Date of Patent: Oct. 7, 2025

(54) BOARD HOLDER FOR STORING A MARINE BOARD

(71) Applicant: BOMBARDIER RECREATIONAL PRODUCTS INC., Valcourt (CA)

(72) Inventor: Marc-Andre L'Heureux, Bromont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 458 days.

(21) Appl. No.: 18/159,997

(22) Filed: Jan. 26, 2023

(65) Prior Publication Data
US 2023/0242222 A1      Aug. 3, 2023

Related U.S. Application Data

(60) Provisional application No. 63/305,221, filed on Jan. 31, 2022.

(51) Int. Cl.
*B63B 32/83* (2020.01)
(52) U.S. Cl.
CPC .................................. *B63B 32/83* (2020.02)
(58) Field of Classification Search
CPC ........... B63B 32/80; B63B 32/83; B60R 9/08; B60R 9/12
See application file for complete search history.

(56) References Cited

U.S. PATENT DOCUMENTS

| | | | |
|---|---|---|---|
| 5,067,644 A * | 11/1991 | Coleman | B60R 9/048 224/318 |
| 2005/0155999 A1 | 7/2005 | Gasper | |
| 2015/0259045 A1 * | 9/2015 | Wilhelm | A47F 7/0028 211/85.7 |
| 2021/0362812 A1 * | 11/2021 | Grayson | F16M 13/022 |
| 2022/0227461 A1 | 7/2022 | l'Heureux et al. | |
| 2022/0250552 A1 * | 8/2022 | Dayani | B60R 9/058 |
| 2023/0373596 A1 * | 11/2023 | Malec | B63B 17/00 |

FOREIGN PATENT DOCUMENTS

GB         2588911 A  *  5/2021  ............... B60R 9/08

OTHER PUBLICATIONS https://www.onaqua.eu/shop/wake/wake-sports-accessories/wakeboard-accessories/monster-tower-wakeboard-rack/ Copyright 2022, retrieved from the internet on May 29, 2023.
https://jetboatpilot.com/products/yamaha-ar-series-removable-deluxe-swivel-wakeboard-rack retrieved from the internet on May 29, 2023.

* cited by examiner

*Primary Examiner* — Andrew Polay
(74) *Attorney, Agent, or Firm* — BCF LLP

(57) ABSTRACT

A board holder for storing a marine board includes: a body extending in a length direction, the body having a board support for receiving and supporting a first lateral side of the marine board; a first strap fixed to the body at or near the board support; a first fastener adjustably fixed to the first strap; a second strap fixed to the body at: a first location spaced from the board support in the length direction; and a second location disposed between the first location and the board support; and a second fastener freely movable along the second strap, the second fastener being configured to be complementarily mated with the first fastener. When the fasteners are mated with one another, the second strap is positioned to at least partly wrap about the second lateral side of the marine board to secure the marine board in place on the board holder.

17 Claims, 15 Drawing Sheets

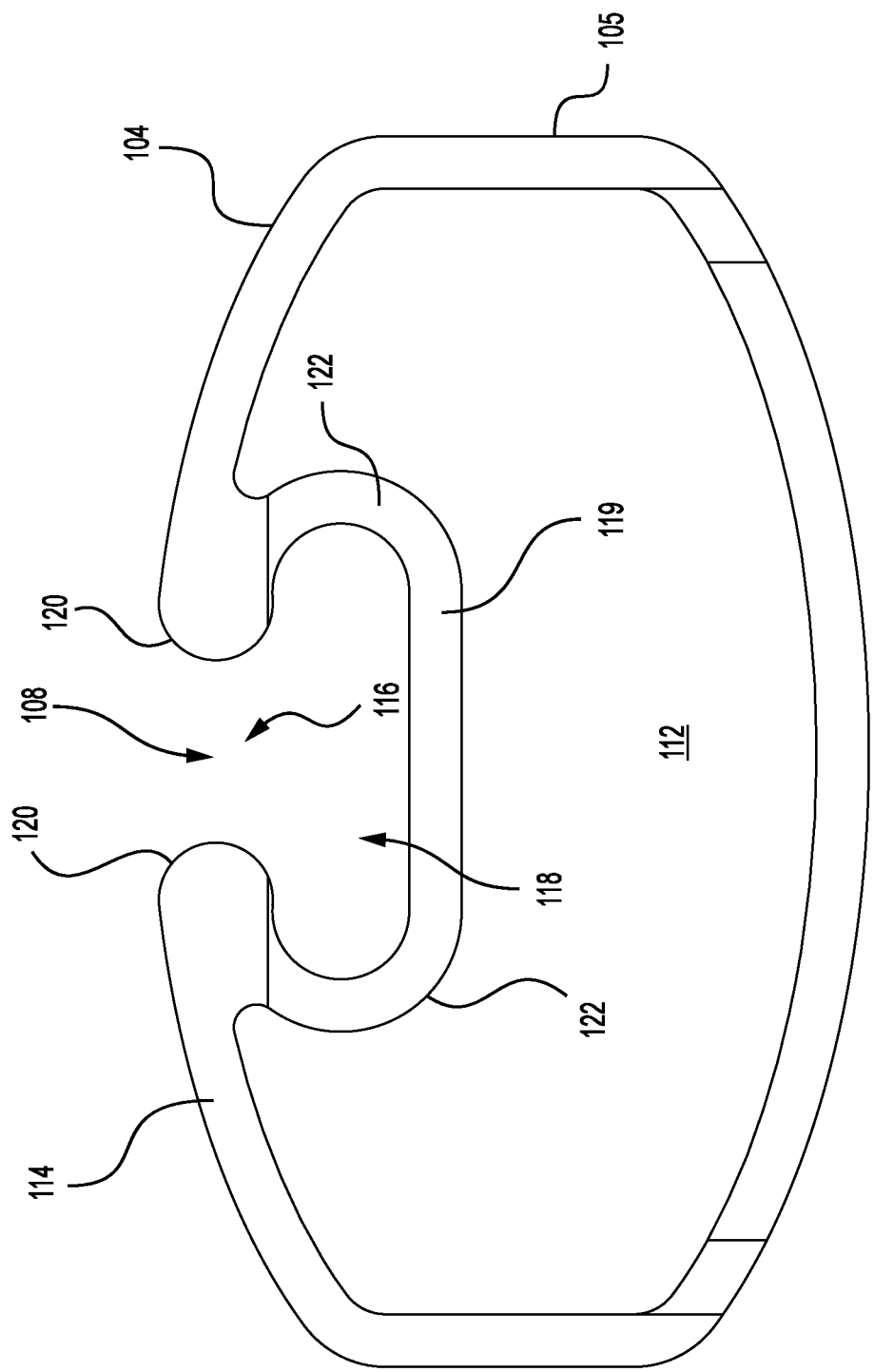

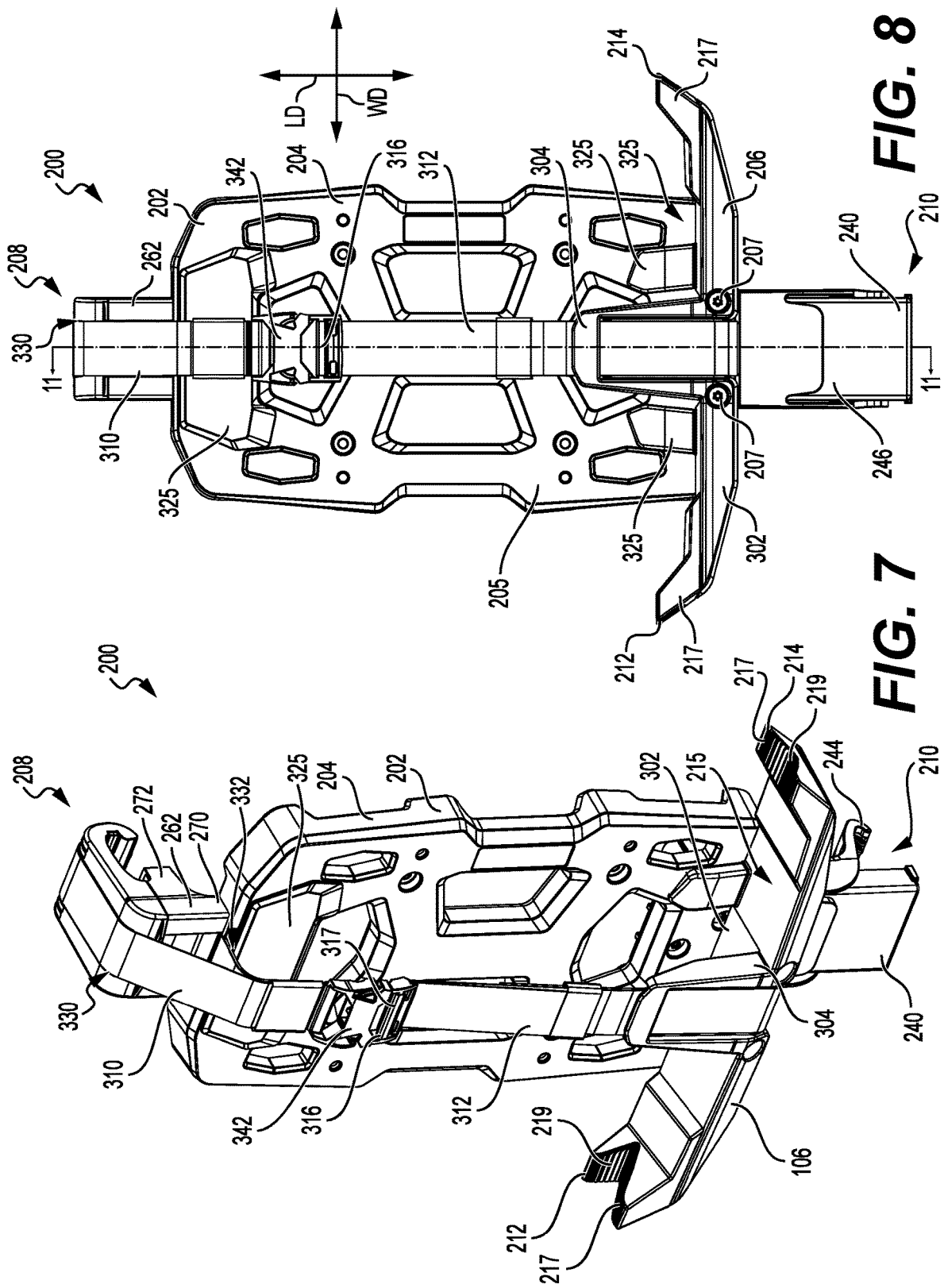

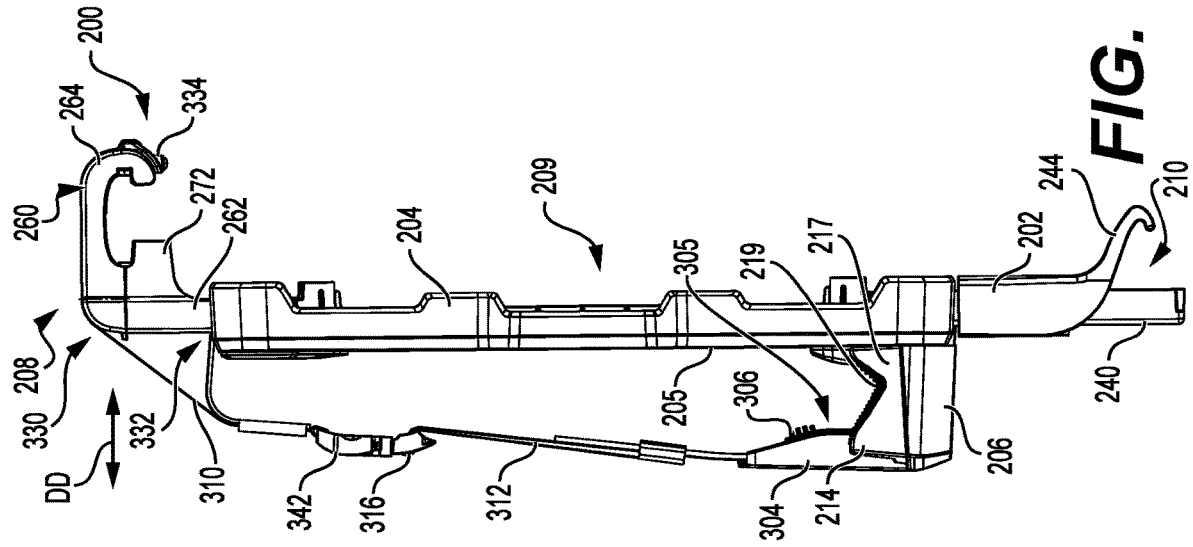
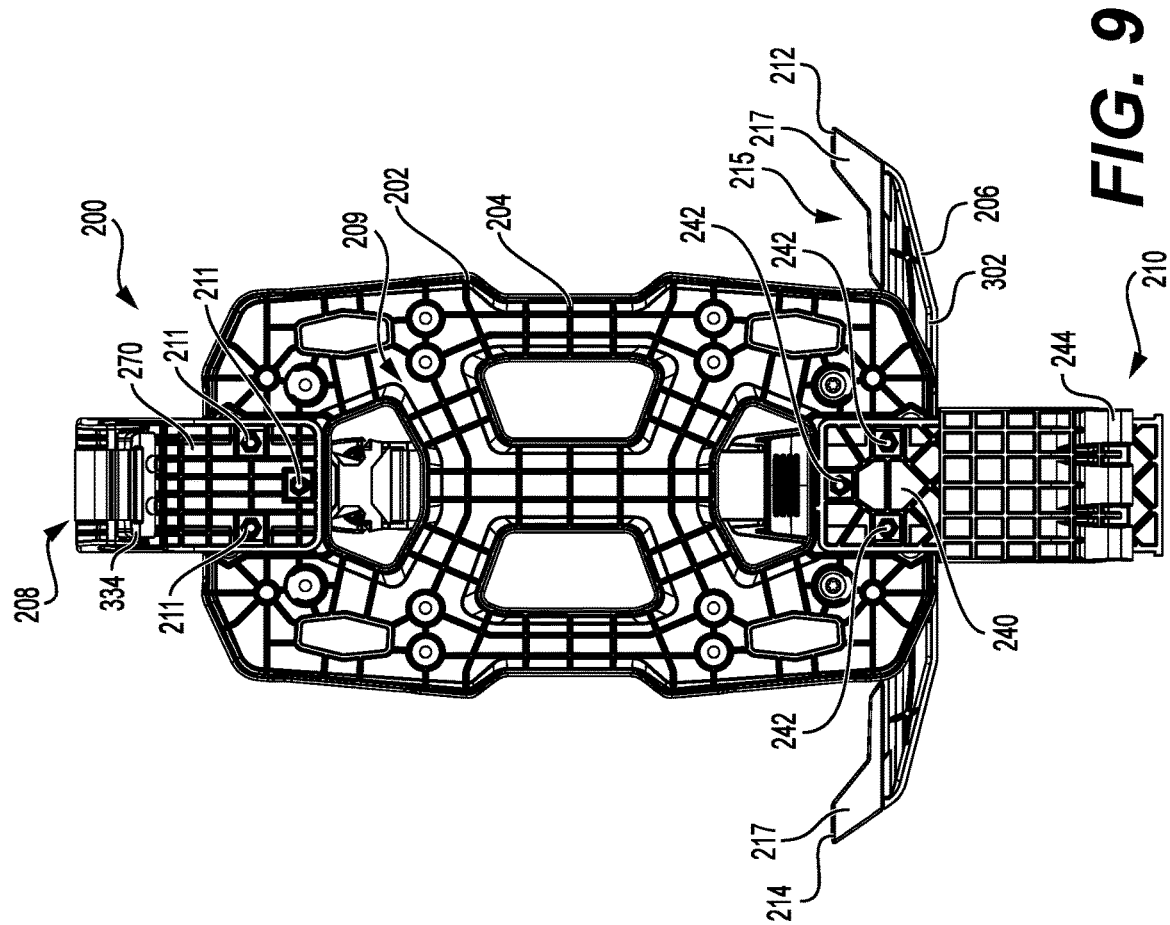

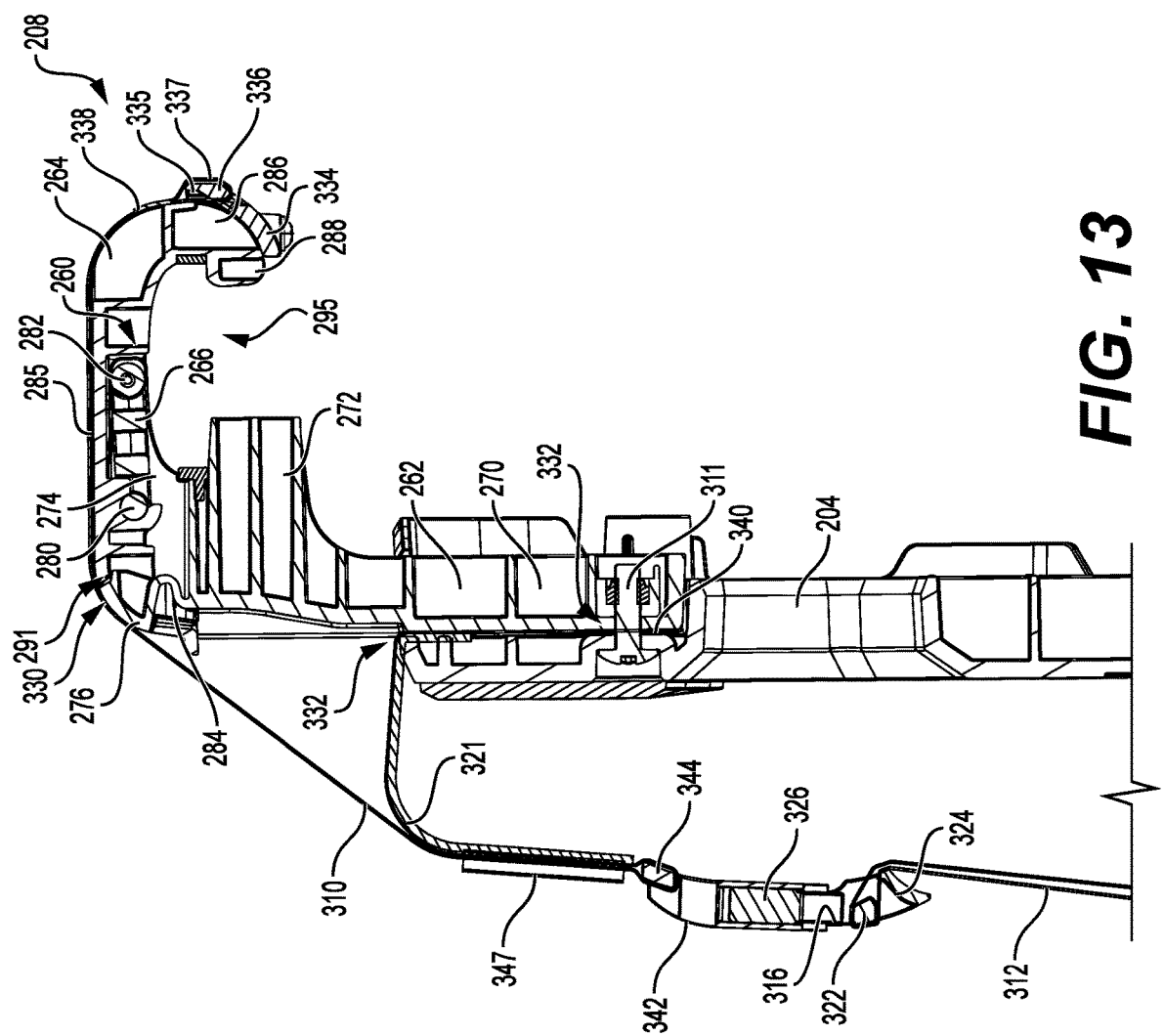

BOARD HOLDER FOR STORING A MARINE BOARD

CROSS-REFERENCE

The present application claims priority from U.S. Provisional Patent Application No. 63/305,221, filed Jan. 31, 2022, the entirety of which is incorporated by reference herein.

FIELD OF TECHNOLOGY

The present technology relates to board holders for storing marine boards.

BACKGROUND

Many sports and recreational activities, such as wakeboarding, wakeskating, surfing, paddleboarding and water skiing amongst others, involve using a marine board on water. In many cases, it is desirable to have a board-storing solution for storing the marine board when it is not being used. Such board-storing solutions are sometimes adapted on different types of watercraft as it allows the occupant(s) to store their marine board in a place where it can be accessible for use when desired.

However, such board-storing solutions are often only capable of securely storing a specific type of marine board or a specific size of marine board. Moreover, some types of board-storing solutions implement elastic cords enable the system to hold marine boards of varying shapes and sizes. This typically results in a degrading performance over time as the elastic cords lose their elasticity through regular wear (particularly in a marine environment). In some cases, existing board-storing solutions are also overly complex and/or expensive to produce.

In view of the foregoing, there is a need for a board holder that addresses at least some of these drawbacks.

SUMMARY

It is an object of the present technology to ameliorate at least some of the inconveniences present in the prior art.

According to an aspect of the present technology, there is provided a board holder for storing a marine board, comprising: a body extending in a length direction and having a width direction perpendicular to the length direction, the body comprising a board support configured to receive and support a first lateral side of the marine board such that, in use, the first lateral side and a second lateral side of the marine board are spaced from one another in the length direction of the body; a first strap fixed to the body at or near the board support; a first fastener adjustably fixed to the first strap for adjusting and fixing a position of the first fastener along a length of the first strap; a second strap fixed to the body at: a first location spaced from the board support in the length direction; and a second location disposed, in the length direction, between the first location and the board support; and a second fastener freely movable along a length of the second strap, the second fastener being configured to be complementarily mated with the first fastener, in response to the first fastener and the second fastener mating with one another, the second strap being positioned to at least partly wrap about the second lateral side of the marine board to secure the marine board in place on the board holder.

In some embodiments, the board support has an inner side configured to support the first lateral side of the marine board; and a shape of the inner side is generally concave.

In some embodiments, the board support is wider than a remainder of the body.

In some embodiments, the board support comprises: a first width end; a second width end spaced from the first width end in the width direction; and a midpoint centered between the first width end and the second width end, in the length direction of the body, a distance between the midpoint and the first location being greater than a distance between the first and second width ends and the first location.

In some embodiments, each of the first and second width ends of the board support defines a generally V-shaped recess.

In some embodiments, a point at which the first strap is fixed to the body is generally aligned with the first location and the second location in the width direction.

In some embodiments, the first strap has a first strap end and a second strap end; the first strap end is fixed to the body; and the second strap end is free when the first and second fasteners are disconnected from one another.

In some embodiments, the body comprises a main body portion extending at least in part between the second location and the board support, the board support being connected to the main body portion; the main body portion has a board-facing side configured to face the marine board when the marine board is secured to the board holder; and the board holder further comprises at least one protective element connected to the main body portion on the board-facing side thereof, the at least one protective element being made of an elastomeric material to provide protective contact with the marine board.

In some embodiments, the first fastener is one of a male fastener and a female fastener; and the second fastener is an other one of the male fastener and the female fastener.

In some embodiments, the first fastener and the second fastener together form a buckle.

In some embodiments, the board holder comprises at least one connector for selectively connecting the board holder to part of a watercraft.

In some embodiments, the at least one connector is configured to be connected to a handrail of the watercraft.

In some embodiments, in use, when the marine board is secured to the board holder, the second strap limits movement of the second lateral side of the marine board in a depth direction of the board holder, the depth direction being perpendicular to the length and width directions.

In some embodiments, in use, in response to the first fastener and the second fastener mating with one another: a first portion of the second strap extending between the first location and the second fastener extends over the second lateral side of the marine board; and a second portion of the second strap extending between the second location and the second fastener extends over the second lateral side of the marine board, the second portion of the second strap being disposed between the first portion of the second strap and the second lateral side of the marine board in the length direction of the body.

In some embodiments, a watercraft comprises: a deck; a hull supported by the deck; a connecting structure for connecting accessories to the watercraft; and the board holder, the board holder being connected to the connecting structure of the watercraft.

In some embodiments, the connecting structure is a barrier structure surrounding at least part of the deck.

In some embodiments, the barrier structure comprises a handrail, the board holder being connected to the handrail.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 is a cross-sectional view of the lower rail of FIG. 5 taken along line 6-6 in FIG. 5;

FIG. 7 is a perspective view, taken from a top, rear, left side, of the board holder of FIG. 1;

FIG. 8 is a left side elevation view of the board holder of FIG. 7;

FIG. 9 is a right side elevation view of the board holder of FIG. 7;

FIG. 10 is a rear side elevation view of the board holder of FIG. 7;

FIG. 13 is a detailed view of another part of the cross-section of FIG. 11;

DETAILED DESCRIPTION

Figure 1:
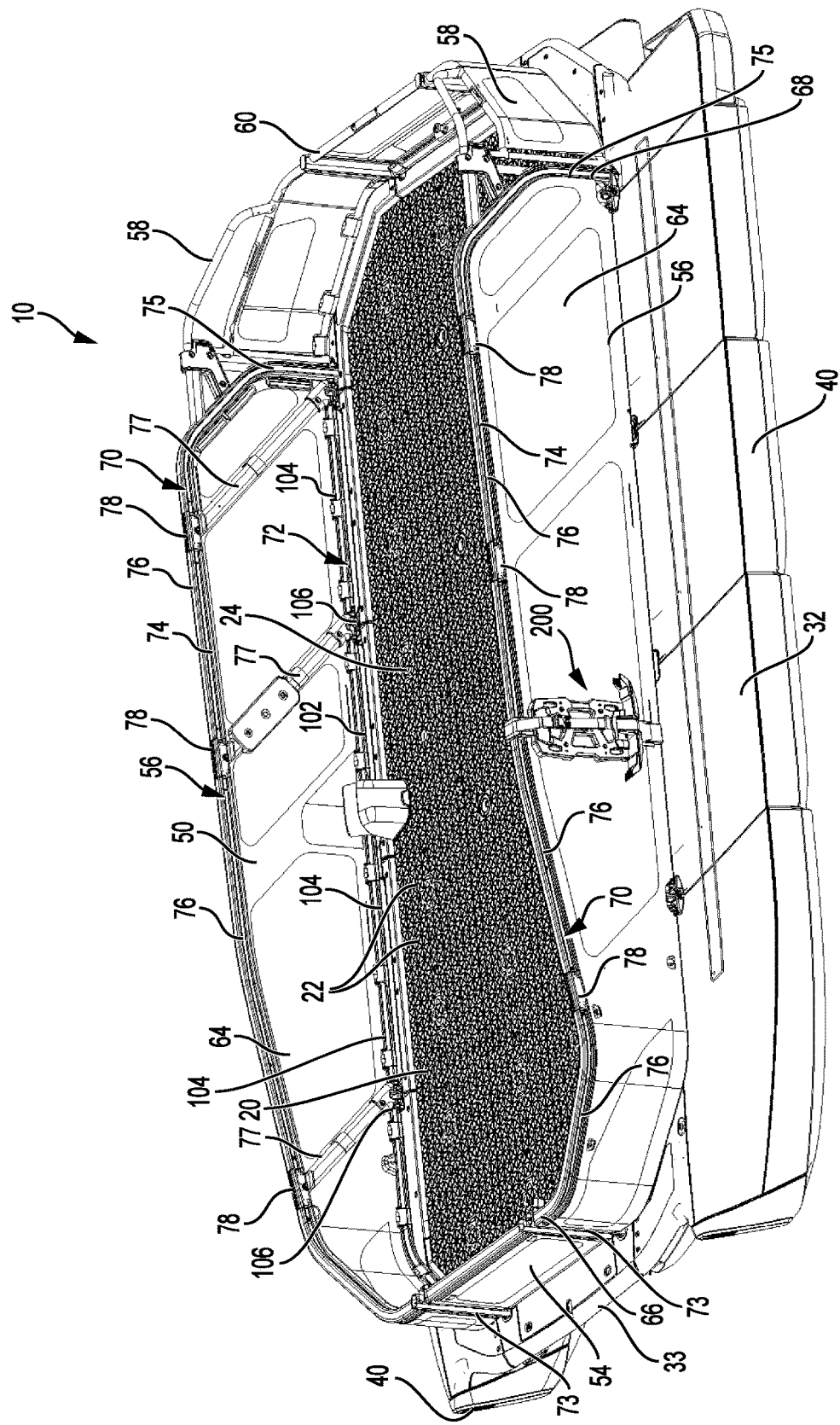
FIG. 1 is a perspective view, taken from a top, front, left side, of a pontoon boat equipped with a board holder according to an embodiment of the present technology.
Figure 2:
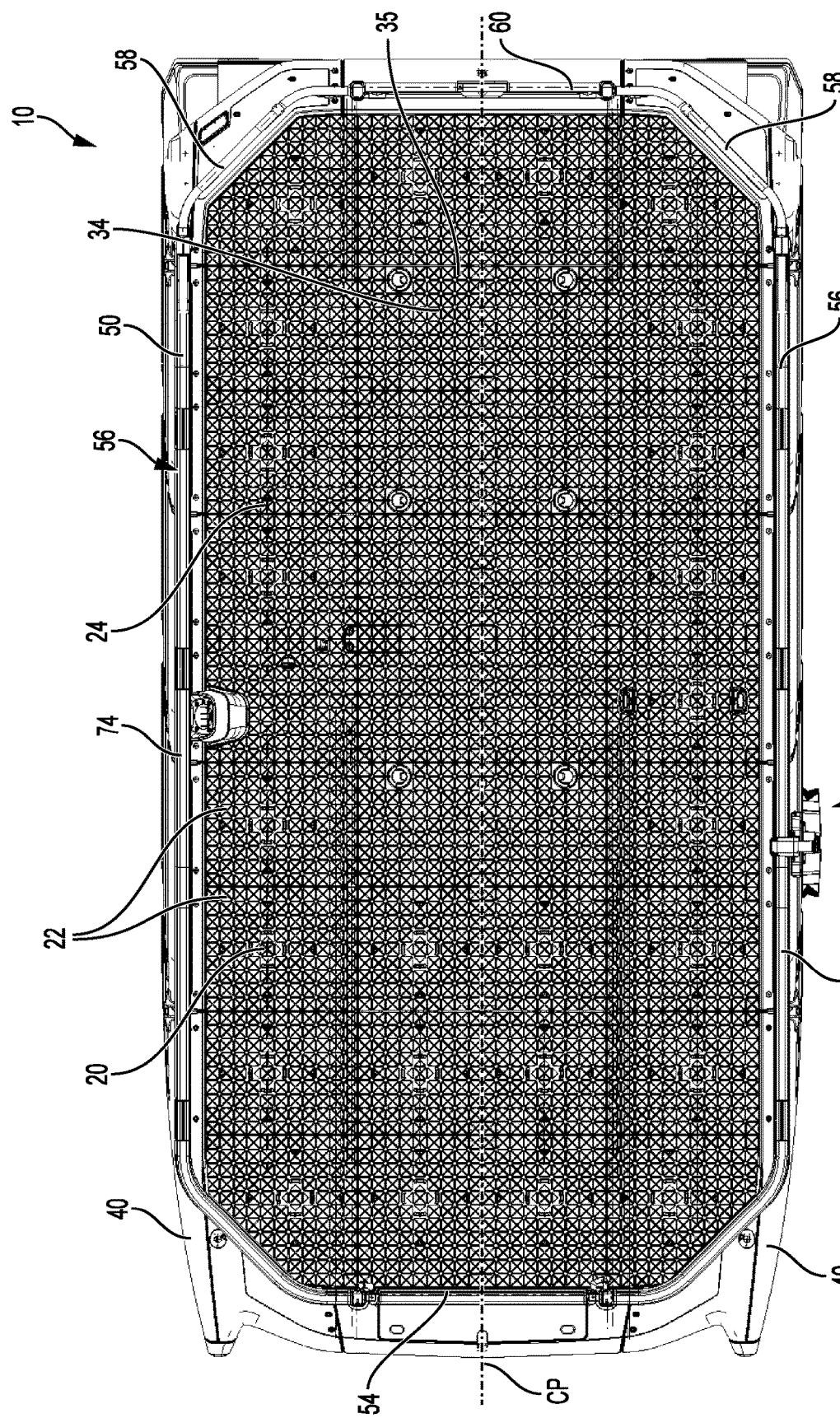
FIG. 2 is a top plan view of the pontoon boat of FIG. 1.
Figure 3:
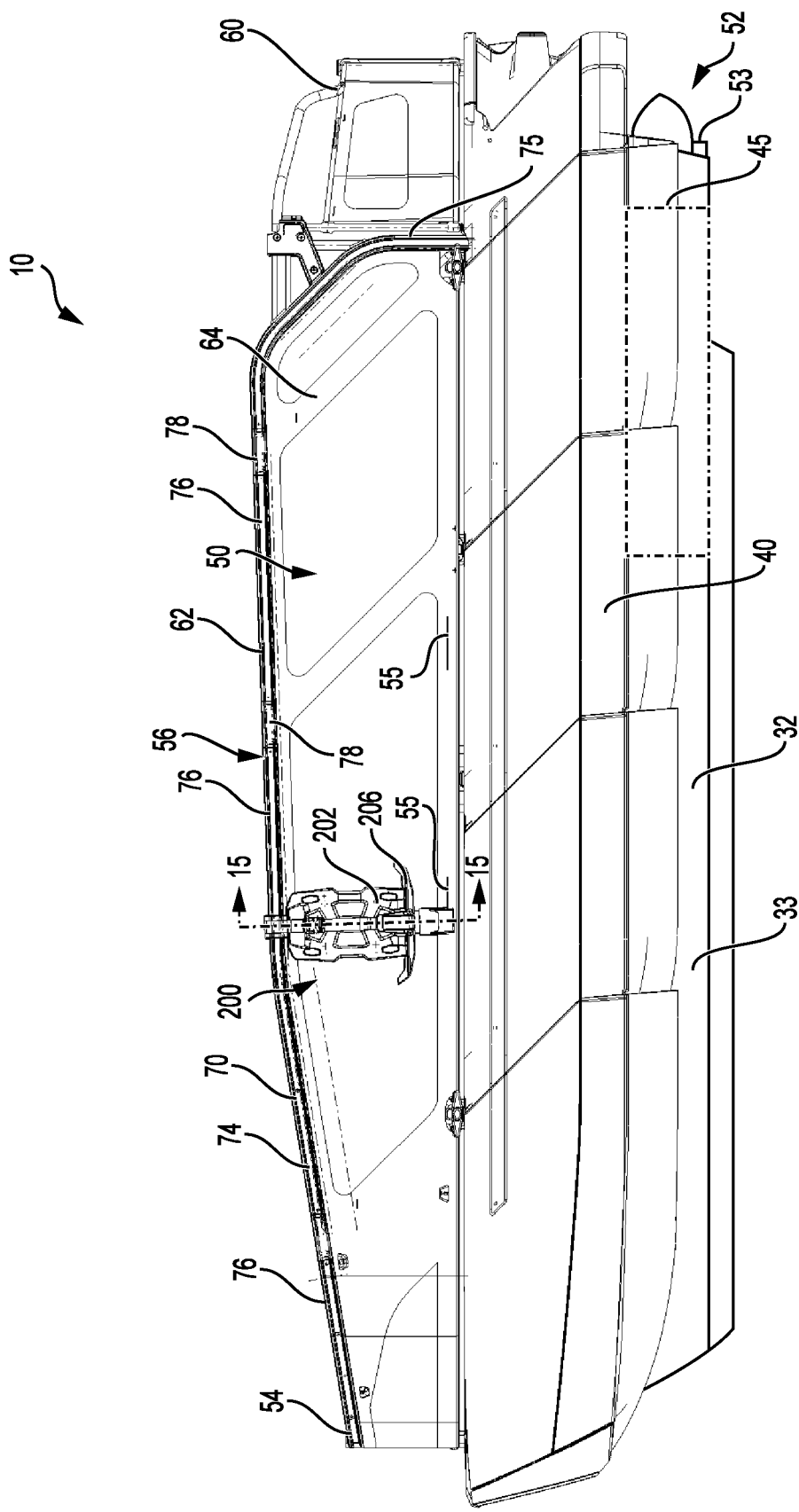
FIG. 3 is a left side elevation view of the pontoon boat of FIG. 1.

A board holder 200 according to an embodiment of the present technology is shown installed on a watercraft 10 in FIGS. 1 to 3. The board holder 200 is configured to store a marine board 75 (FIG. 17) that is used for marine boards-ports. For instance, examples of the marine board 75 include surfboards, wakeboards, wakeskates, paddleboards, water skis amongst others. Moreover, as will be described in greater detail below, the board holder 200 is configured to allow marine boards of different sizes to be stored thereon. Although the board holder 200 is shown installed on the watercraft 10, the board holder 200 could be used on different types of vehicles and/or other structures in other embodiments.

The watercraft 10 will now be described in greater detail with respect to FIGS. 1 to 6. In this embodiment, the watercraft 10 is a pontoon boat 10. Those of ordinary skill in the art will recognize that there are other known types of watercraft incorporating different designs that could also be configured to be equipped with the board holder 200. As shown in FIG. 1, the boat 10 has a deck 20 and a hull 32 supporting the deck 20. In this embodiment, the hull 32 includes three separate laterally-adjacent portions that are connected to one another to form the hull 32. Notably, the hull 32 has a central portion 33 (FIG. 1) and left and right lateral portions 40. These different hull portions could be considered separate hulls in some cases and thus the boat 10 may be referred to as a multihull watercraft in some cases. Nevertheless, it is contemplated that the hull 32 may constitute a single integral portion in other embodiments and/or be differently sized and shaped.

Figure 4:
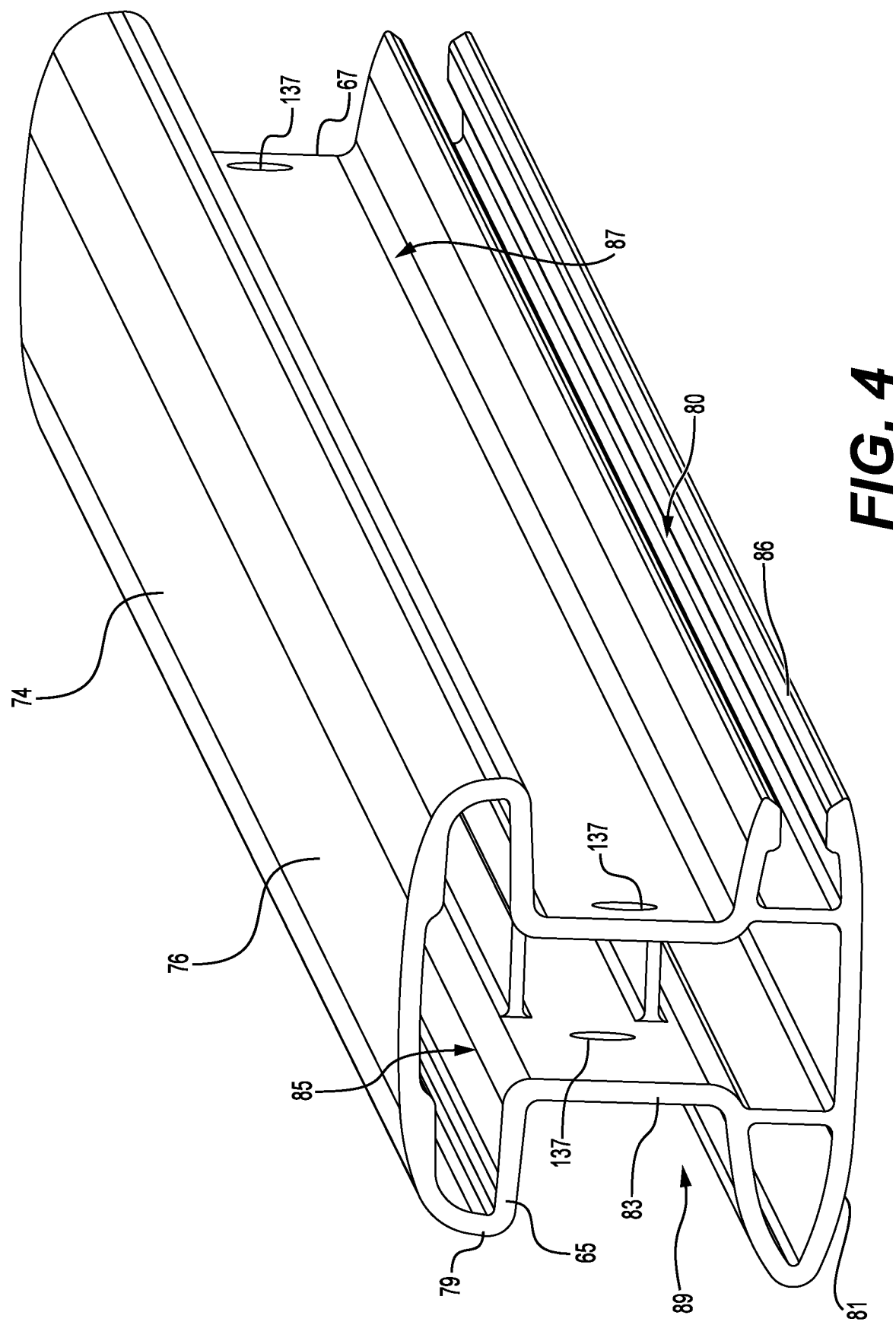
FIG. 4 is a perspective view, taken from a top, front, left side, of part of an upper rail of a left lateral portion of a barrier structure of the pontoon boat of FIG. 1.

The deck 20 extends above the hull 32 and is supported thereby. The deck 20 has an upper surface 24 for supporting occupants, as well as accessories and accommodations of the boat 10 (e.g., seating, command console, etc.). In this embodiment, as shown in FIGS. 1 and 4, the deck 20 includes a plurality of tiles 22 which are configured for attachment of accessories thereto. The tiles 22 form a portion of the upper surface 24 of the deck 20. It is contemplated that the deck 20 could have a different construction than that provided by the tiles 22. For instance, the deck 20 could have a more conventional construction such as including a metallic frame and an overlying flooring layer, such as wooden panels or plywood. It is further contemplated that the deck 20 could include multiple levels and/or seating or other accessories integrated therein.

In this embodiment, the hull 32 and the deck 20 of the boat 10 have a modular construction. Notably, the hull 32 includes various modular units that are connected to one another to form the hull 32. In particular, the modular units of the hull 32 are longitudinally-adjacent to one another and therefore hulls of different sizes can be assembled depending on how many modular units are connected to one another. Similarly, the deck 20 is modular due to its construction by the tiles 22. Therefore, as will be understood, the boat 10 can have different lengths depending on the modular construction the deck 20 and the hull 32. It is contemplated that the hull 32 and the deck 20 could be non-modular in other embodiments.

The boat 10 is propelled by a jet propulsion system 52 (shown in part in FIG. 3) powered by a motor (not shown). The jet propulsion system 52 has a steering nozzle 53 used for steering the boat 10. A handlebar (not shown) is operatively connected to the steering nozzle 53. A throttle lever (not shown) is operatively connected to the motor for controlling operation of the motor. The handlebar and the throttle lever are located on a command console provided on the deck 20. The command console is not shown in the figures in order to properly show the upper surface 24 of the deck 20. It is contemplated that other propulsion systems, such as a stem drive or a marine outboard engine, may be used to propel the boat 10. It is also contemplated that the handlebar could be replaced by a steering wheel and that the steering nozzle 53 could be replaced by an outdrive or one or more rudders.

A powerpack 45 (schematically illustrated in FIG. 3) of the boat 10, including the jet propulsion system 52 and the motor, is enclosed in part by the hull 32. As shown in FIG. 2, a central hull cover 34 overlies the powerpack 45 to partly enclose the powerpack 45 between the hull 32 and the hull cover 34. An upper surface 35 of the central hull cover 34 is contiguous with the upper surface 24 of the deck 20 (i.e., flush therewith).

The boat 10 has a barrier structure 50 that surrounds at least part of the deck 20 and extends upwardly therefrom. In particular, the barrier structure 50 is located along a periphery of the boat 10 (as defined by the deck 20) to prevent occupants or objects on the deck 20 from accidentally falling off the boat 10. As shown in FIGS. 1 and 2, in this embodiment, the barrier structure 50 generally surrounds the entirety of the deck 20. Notably, the barrier structure 50 includes a front end portion 54, left and right lateral portions 56, left and right rear corner portions 58, and a rear end portion 60. It is contemplated that the barrier structure 50 could only partially surround the deck 20. For example, one or more of the portions 54, 56, 58, 60 could be omitted.

Figure 5:
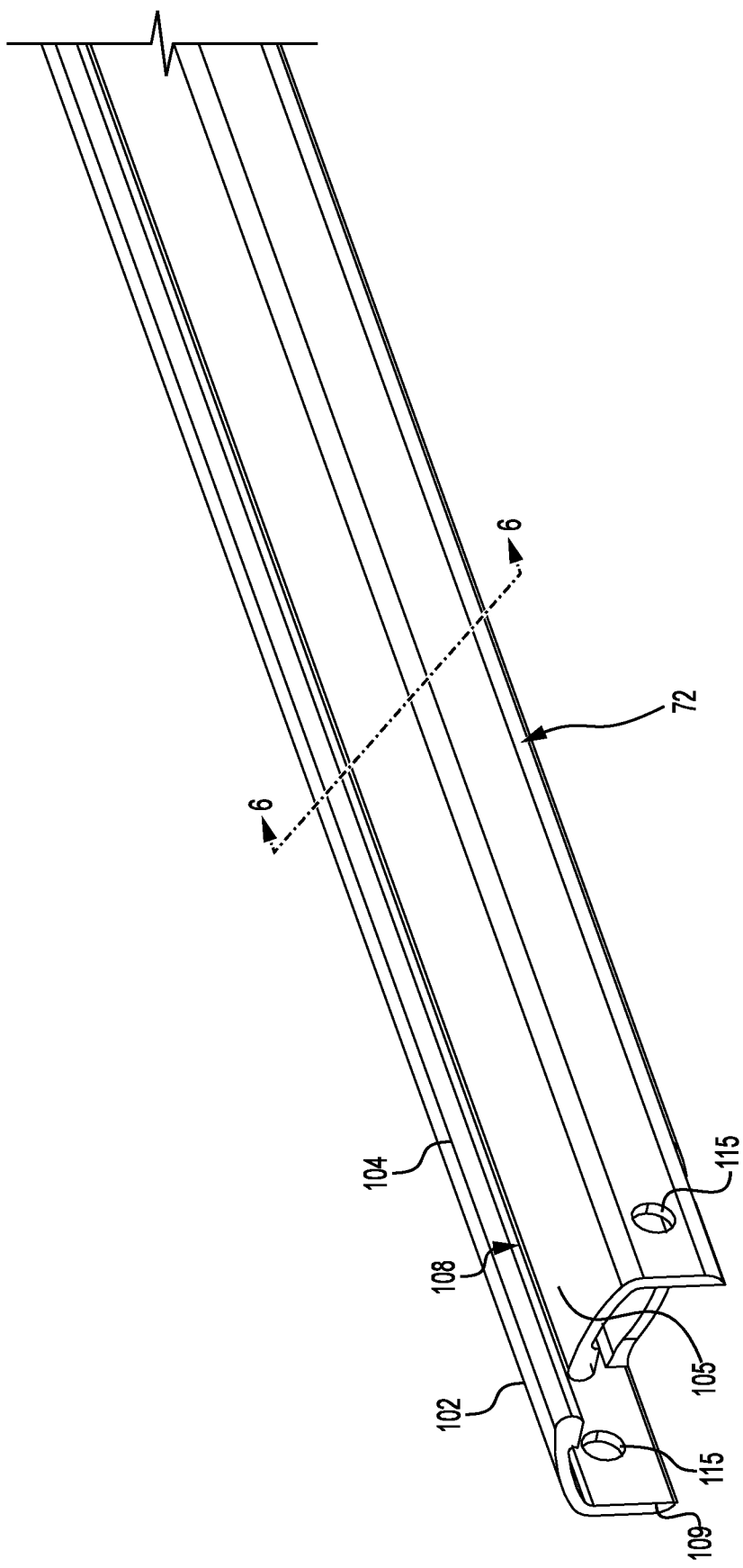
FIG. 5 is a perspective view, taken from a top, front, left side, of part of a lower rail of the left lateral portion of the barrier structure of the pontoon boat of FIG. 5.

In this embodiment, the barrier structure 50 is adaptable to the different possible lengths of the boat 10 mentioned above with regard to the modular construction of the deck 20 and the hull 32. In other words, depending on the modular construction of the deck 20 and the hull 32, the barrier structure 50 can be made longer or shorter accordingly. More specifically, as shown in FIG. 5, the lateral portions 56 of the barrier structure 50 can be made longer by including additional frame members thereof. As the left and right lateral portions 56 are mirror images of one another about a longitudinal centerplane CP (FIG. 2) of the boat 10, only the left lateral portion 56 will be described in detail herein. It is to be understood that the same description applies to the right lateral portion 56.

As shown in FIG. 1, the lateral portion 56 of the barrier structure 50 has a frame 62 and a pliable sheet wall 64 connected thereto. The frame 62 connects the lateral portion 56 to the hull 32 of the boat 10. The frame 62 extends generally longitudinally from a front end 66 to a rear end 68. The frame 62 has an upper portion 70 and a lower portion 72 connected to one another. Notably, a front end member 73, a rear end member 75 and a plurality of support members 77 (shown for the right lateral portion 56 of the barrier structure in FIG. 1) extend between the upper and lower portions 70, 72 of the frame 62. The front and rear end members 73, 75 are connected to the hull 32.

The upper portion 70 of the frame 62 includes an upper rail 74 configured for grabbing by a user's hand. The upper rail 74 is thus also commonly referred to as a "hand rail" or a "grab rail". Notably, the upper rail 74 can be defined as a structure that can be grabbed by a user's hand and extends at the minimum 24 inches above the deck 20, in compliance with American Boat and Yacht Council (ABYC) H-41 regulations on "Reboarding Means, Ladders, Handholds, Rails and Lifelines". The upper rail 74 includes a plurality of upper rail members 76 that are connected to one another by interconnectors 78 extending between consecutive ones of the upper rail members 76. Notably, each interconnector 78 is fastened to two of the upper rail members 76. The interconnectors 78 are also used for connecting the support members 77 between the upper and lower portions 70, 72 of the frame 62.

In this embodiment, each upper rail member 76 has the cross-sectional profile shown in FIG. 4. Therefore, only one of the upper rail members 76 will be described herein. As can be seen, the cross-sectional profile of the upper rail member 76 is generally I-shaped, notably including a wide upper portion 79, a wide lower portion 81 and a narrow intermediate portion 83 extending between the wide upper and lower portions 79, 81. In this embodiment, the upper rail member 76 is an extruded component and defines an interior hollow space 85 therein. In this embodiment, in order to connect the pliable sheet wall 64 to the upper rail 74, the rail member 76 defines a channel 80 extending along a length of the upper rail member 76, namely between its opposite ends 65, 67. The channel 80 is configured to receive an interlocking member 88 (best shown in FIG. 16) of the pliable sheet wall 64 for connecting the pliable sheet wall 64 to the upper rail 74. As shown in FIG. 4, the channel 80 is defined by the wide lower portion 83 of the upper rail member 76 on a laterally-outward side thereof such that the channel 80 extends along a laterally-outward side of the upper rail member 76 and thus of the upper rail 74.

Turning now to the lower portion 72 of the frame 62, as shown in FIG. 1, the lower portion 72 includes a lower rail 102 that extends below the upper rail 74. The lower rail 102 extends generally parallel to the upper surface 24 of the deck 20. The lower rail 102 has a plurality of lower rail members 104, best shown in FIG. 5, that are interconnected to one another by lower frame connectors 106 (FIG. 1). The lower frame connectors 106 also connect the lower rail 102 to the hull 32. Notably, the lower frame connectors 106 extend downwardly from the lower rail 102 into a recess defined between the hull 32 and the deck 20 to connect to a member of the hull 32 therein.

In this embodiment, each lower rail member 104 has the cross-sectional profile shown in FIG. 6. Therefore, only one of the lower railing members 104 will be described in detail herein. As can be seen, in this embodiment, the cross-sectional profile of the lower rail member 104 is generally oval with two truncated ends. In this embodiment, the lower rail member 104 is an extruded component having an outer wall 105 defining an interior hollow space 112 therein. An upper portion 114 of the outer wall 105, facing upwardly toward the upper portion 70 of the frame 62, defines a slot 108 configured to receive therein one or more lower anchors (not shown) which are configured to connect the lower edge of the pliable sheet wall 64 to the lower rail 102. The slot 108 thus faces upwardly toward the upper rail 74. The anchor mounting slot 108 has a narrow section 116 and an enlarged section 118 that is wider than the narrow section 116. The narrow section 116 of the slot 108 is defined by two rounded upper ends 120 disposed opposite one another. An interior wall 119 defines the enlarged section 118 of the slot 108. The interior wall 119 extends downwardly from the upper ends 120 to form two curved lateral ends 122 of the enlarged section 118 of the slot 108, and extends horizontally between the two lateral ends 122.

As can be seen in FIG. 5, the end portions 109 of the lower rail member 104 have two spaced opposite walls corresponding to the ends of the oval shaped cross-sectional profile shown in FIG. 6. Each of the two walls of the end portions 109 of the lower railing member 104 defines a respective opening 115 to fasten the lower railing member 104 to the lower frame connectors 106.

The board holder 200 will now be described in detail with reference to FIGS. 7 to 13. The board holder 200 has a body 202 that extends in a length direction LD (FIG. 8) to define a length of the board holder 200 between opposite ends thereof. The body 202 has a main body portion 204 that acts as a frame of the board holder 200 and has an outer surface 205 which, in use, faces the marine board 75. In this embodiment, the body 202 also has an upper connector 208 and a lower connector 210 disposed at opposite ends of the main body portion 204. The upper and lower connectors 208, 210 are provided for connecting the board holder 200 to the boat 10. Notably, in this embodiment, the upper and lower connectors 208, 210 are configured to removably connect the board holder 200 to the barrier structure 50. In particular, the upper connector 208 is connectable to the upper rail 74 while the lower connector 210 is connectable to the lower rail 102 of the lateral portion 56 of the barrier structure 50. A detailed description of the upper and lower connectors 208, 210 and the manner in which they are connected to the barrier structure 50 can be found in U.S. patent application Ser. No. 17/577,720 (Publication No. US2022/0227461), filed Jan. 18, 2022, the entirety of which is incorporated by reference herein. A brief summary description of the upper and lower connectors 208, 210 will thus be provided herein.

With reference to FIGS. 9 to 11 and 13, the upper connector 208 includes a locking assembly 260 configured to be selectively locked onto the upper rail 74 of the barrier structure 50. That is, the locking assembly 260 is operable by the user to lock the board holder 200 to the upper rail 74. The locking assembly 260 includes a fixed member 262 connected to the main body portion 104, a locking member 264 movable relative to the fixed member 262, and a pivot member 266 operatively connecting the locking member 264 to the fixed member 262.

Figure 11:
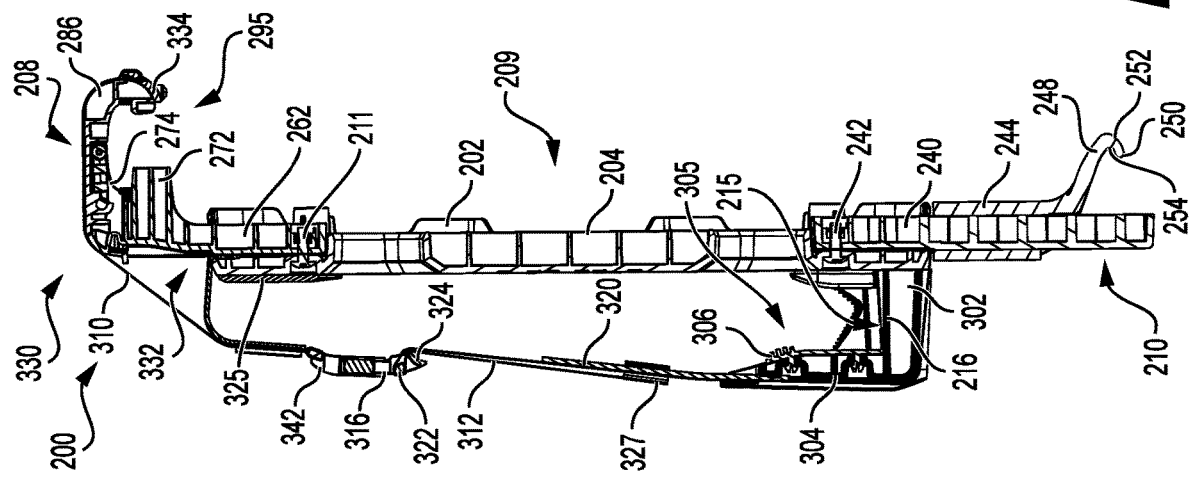
FIG. 11 is a cross-sectional view of the board holder of FIG. 7 taken along line 11-11 in FIG. 8.

The fixed member 262 is fastened to the upper end portion of the main body portion 204 by three fasteners 211 (FIG. 9). The fixed member 262 extends from the upper end portion the main body portion 204 in a direction away from the lower connector 210 (i.e., upwardly in the frame of reference of the board holder 200). In this embodiment, as shown in FIG. 11, the fixed member 262 is generally F-shaped, namely having a main portion 270 (extending generally vertically when the barrier accessory device 200 is locked onto the upper rail 74) and two protruding portions 272, 274 extending from the main portion 270 generally transversally thereto. As will be discussed below, the lower protruding portion 272 is configured to be received in a recess defined by the upper rail 74. It is contemplated that, in alternative embodiments, the lower protruding portion 272 could be omitted. The fixed member 262 may therefore not be F-shaped, for instance being L-shaped instead.

As best shown in FIG. 13, in this embodiment, the fixed member 262 also has a latch 276 extending upward from the upper end of the main portion 270. The latch 276 is dimensioned to be narrower than the main portion 270. A connection between the latch 276 and the main portion 270 (i.e., the material connecting the latch 276 to the main portion 270) is dimensioned so that the latch 276 is elastically movable relative to the main portion 270. That is, the latch 276 can be moved relative to the main portion 270 and elastically returns to its original position.

The locking member 264 is movable relative to the fixed member 262 between a locked position for the locking assembly 260 to lock onto the upper rail 74 and an unlocked position for the locking assembly 260 to release the upper rail 74. In FIGS. 7 to 11 and 13, the locking member 264 is shown in its locked position. The locking member 264 is pivotable between the locked and unlocked positions about two pivot axes 280, 282 (FIG. 13) which are defined by pivots formed between the fixed member 262 and the pivot member 266 and between the locking member 264 and the pivot member 266. The pivot axes 280, 282 are generally parallel to one another.

The locking member 264 has an outer end portion 284, an inner end portion 286 and a middle portion 285 extending therebetween. In the locked position of the locking member 264, the outer end portion 284 is closer to the main body portion 204 than the inner end portion 286 (i.e., the distance between the outer end portion 284 and the main body portion 204 is less than the distance between the inner end portion 286 and the main body portion 204). As can be seen, in this embodiment, the inner end portion 286 is generally hook-shaped and therefore may be referred to as a hook portion 286 of the locking member 264. The hook portion 286 has a hook tip 288 that, in the locked position of the locking member 264, is vertically offset from the middle portion 285. Notably, in this embodiment, in the locked position of the locking member 264, the hook tip 288 is disposed vertically lower than the middle portion 285. As will be described in detail further below, the hook portion 286 of the locking member 264 is configured to extend into a recess of the upper rail 74.

The locking member 264 defines a latch-receiving recess 291 disposed at the outer end portion 284 configured to receive the latch 276 of the fixed member 262 when the locking member 264 is in the locked position. In the unlocked position of the locking member 264, the latch 276 is removed from the latch-receiving recess 291. The latch-receiving recess 291 is thus shaped and dimensioned to receive and retain the latch 276 therein. Notably, in the locked position of the locking member 264, a lower latching surface of the latch 276 interacts with a surface defining the latch-receiving recess 291 to prevent the locking member 264 from moving to the unlocked position.

With reference now to FIGS. 10 and 11, the lower connector 210 is connected to the main body portion 204 at the lower end portion thereof. Notably, the lower connector 210 has a fixed member 240 that is connected to the main body portion 204 via three fasteners 242 (FIG. 9), and a movable member 244 that is operatively connected to the fixed member 240 and movable relative thereto. In particular, the fixed member 240 has a generally rectangular cross-sectional profile and is received in part within a recess 246 (FIG. 8) defined by the movable member 244. The recess 246 has a rectangular shape corresponding to the shape of the rectangular cross-sectional profile of the fixed member 240. In particular, the recess 246 is dimensioned such that the fixed member 240 is in a running or sliding fit with the recess 246. As such, the movable member 244 is slidable along at least a portion of a length of the fixed member 240 via the recess 246 such that the position of the lower connector 210 is adjustable relative to the main body portion 204. This allows a user to modify the distance between upper and lower connectors 208, 210 which can be useful to adapt the board holder 200 to different positions along the barrier structure 50 and/or to different boats where the distance between the upper and lower rails 74, 102 thereof may be different. In order to keep the movable member 244 from disengaging the fixed member 240, the movable member 244 has an inner shoulder (not shown) that, at a lowermost position of the movable member 244 relative to the fixed member 240, abuts a lip (not shown) at the lowermost end of the fixed member 240.

It is contemplated that, in alternative embodiments, the position of the upper connector 208 relative to the main body portion 204 could be adjustable instead of the lower connector 210. In other embodiments, both positions of the upper and lower connector 208, 210 relative to the main body portion 204 could be adjustable.

The movable member 244 is configured to engage the slot 108 defined by the lower rail 102 of the barrier structure 50. The movable member 244 may thus alternatively be referred to as a slot-engaging member 244. As shown in FIG. 11, the slot-engaging member 244 has a tip portion 248 at its end furthest from the fixed member 240 that is configured to engage the slot 108 of the lower rail 102. The tip portion 248 is hook-shaped to fix the slot-engaging member 244 within the slot 108 of the lower rail 102. In particular, the tip portion 248 has an interior curved surface 254 that defines a cavity that forms the hook-shape of the tip portion 248. The tip portion 248 has a tip 250 and a cam surface 252 extending from the tip 250. The cam surface 252 defines part of the exterior section of the tip portion 248. The cam surface 252 is configured for securing the tip portion 248 to the corresponding lower rail 102.

Figure 15:
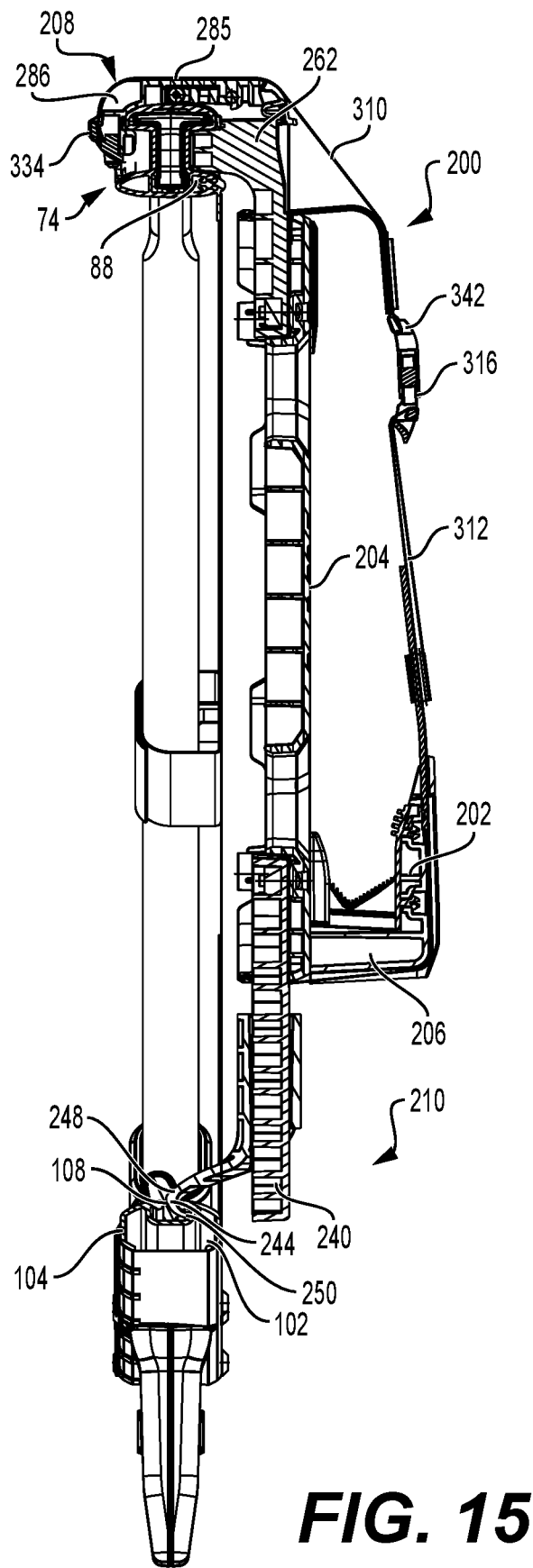
FIG. 15 is a cross-sectional view of the board holder and the barrier structure taken along line 15-15 in FIG. 3.

With reference to FIG. 15, in order to connect the board holder 200 to the boat 10, the lower connector 210 is first engaged with the lower rail 102. Notably, the board holder 200 is inclined and part of the lower connector 210, namely the slot-engaging member 244 thereof, is inserted through one of a plurality of openings 55 (FIG. 3) defined by the wall 64 of the barrier structure 50. The tip portion 248 is then inserted into the upwardly-facing slot 108 of the lower rail 102. In particular, the tip 250 is inserted into the slot 108 such that the interior curved surface 254 of the tip portion 248 comes into contact with the outermost one of the upper ends 120 of the lower rail 102 and the tip 250 contacts the interior wall 119. Next, the board holder 200 is pivoted about the lower connector 210 to an upright position, with the upper connector 208 engaging the upper rail 72. When the board holder 200 is placed in its upright position, the cam surface 252 of the tip portion 248 slides against the interior wall 119 of the lower rail 102 to a position in which the engagement between the cam surface 252 and the interior wall 119, as well as between the interior curved surface 254 and the outermost one of the upper ends 120 of the lower rail 102, retains the lower connector 210 to the lower rail 102.

When the upper connector 208 engages the upper rail 74, the locking member 264 of the locking assembly 260 is in its unlocked position and the latch 276 is not received in the latch-receiving recess 291. The lower protruding portion 272 of the fixed member 262 is received in a recess 87 (FIG. 16) formed on the outer side of the upper rail 74. Notably, the recess 87 is defined by the wide upper portion 79, the wide lower portion 81 and the narrow intermediate portion 83 of the upper rail 74. The lower protruding portion 272 is shaped and dimensioned so that a close fit exists between the lower protruding portion 272 and the surfaces defining the recess 87. This can help provide a better interlock between the upper rail connector 204 and the upper rail 74. Moreover, at this stage, the wide upper portion 79 of the upper rail 74 is disposed between the lower and upper protruding portions 272, 274 of the fixed member 262. The pivot member 266 is thus disposed above the wide upper portion 79 of the upper rail 74.

In order to lock the locking assembly 260 to the upper rail 74, the locking member 264 is inclined with the pivot member 266 extending upwardly, and the hook tip 288 of the hook portion 286 is disposed in a recess 89 formed on the inner side of the upper rail 74 (opposite the recess 87 on the outer side). The recess 89 is defined by the wide upper portion 79, the wide lower portion 81 and the narrow intermediate portion 83 of the upper rail 74. As such, the hook tip 288 and the lower protruding portion 272 are disposed on opposite sides of the upper rail 74. At this point, the locking assembly 260 is ready to be locked onto the rail 74.

Figure 14:
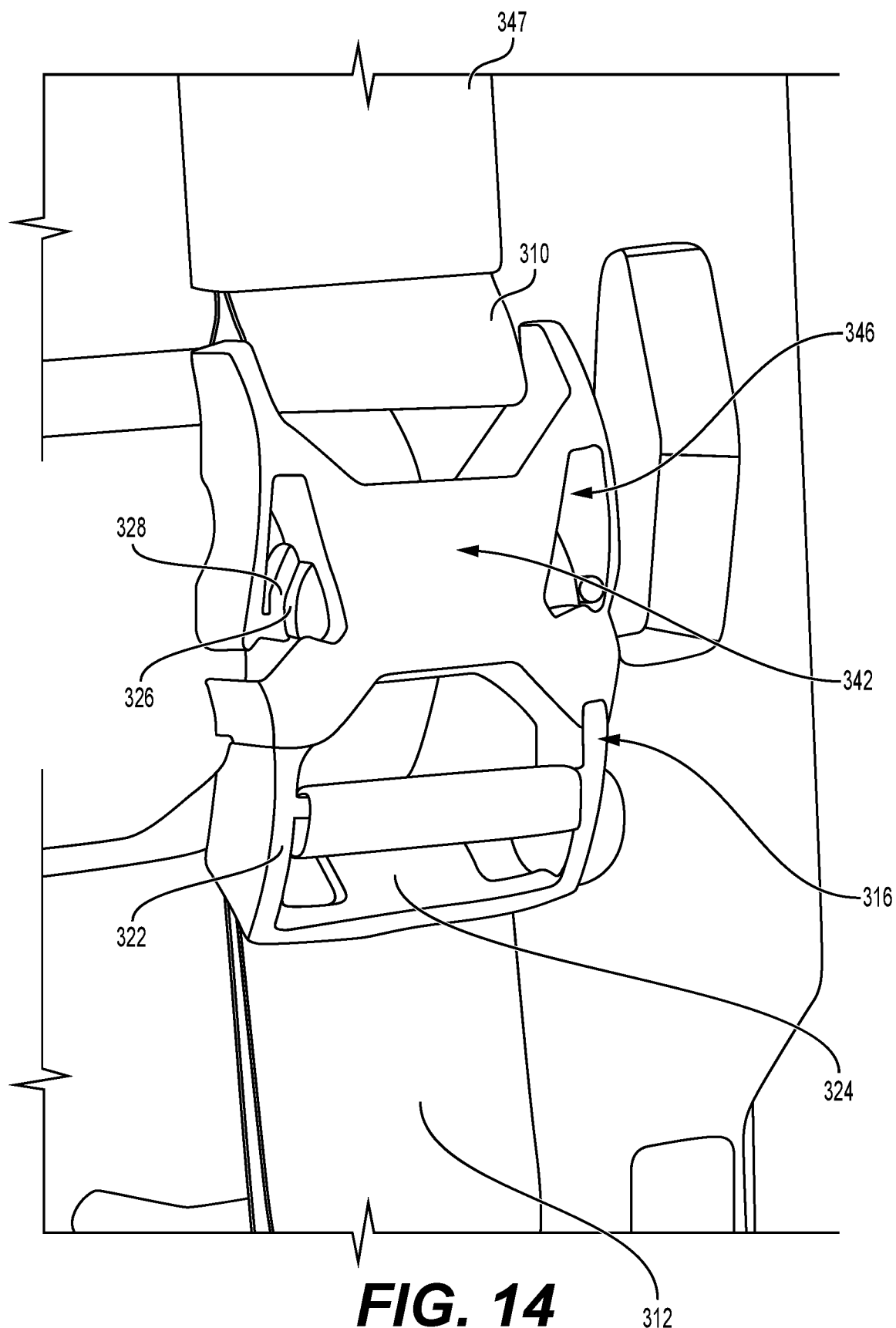
FIG. 14 is a perspective view, taken from a top, front, left side, of two fasteners and two straps of the board holder of FIG. 7.

The locking member 264 is then pivoted downward (about the axes 280, 282) to its locked position so that the locking assembly 260 locks onto the rail 74, as shown in FIG. 14. As the locking member 264 is pivoted downward, a lower edge of the locking member 264 at the outer end portion 284 slips over the curved outer surface 279 of the latch 276 and the locking member 264 moves the latch 276 inwardly until the latch 276 is received in the latch-receiving recess 291 of the locking member 264. At this point, the latch 276 is permitted to move back to its original position, where it prevents the locking member 264 from moving back to the unlocked position.

Figure 16:
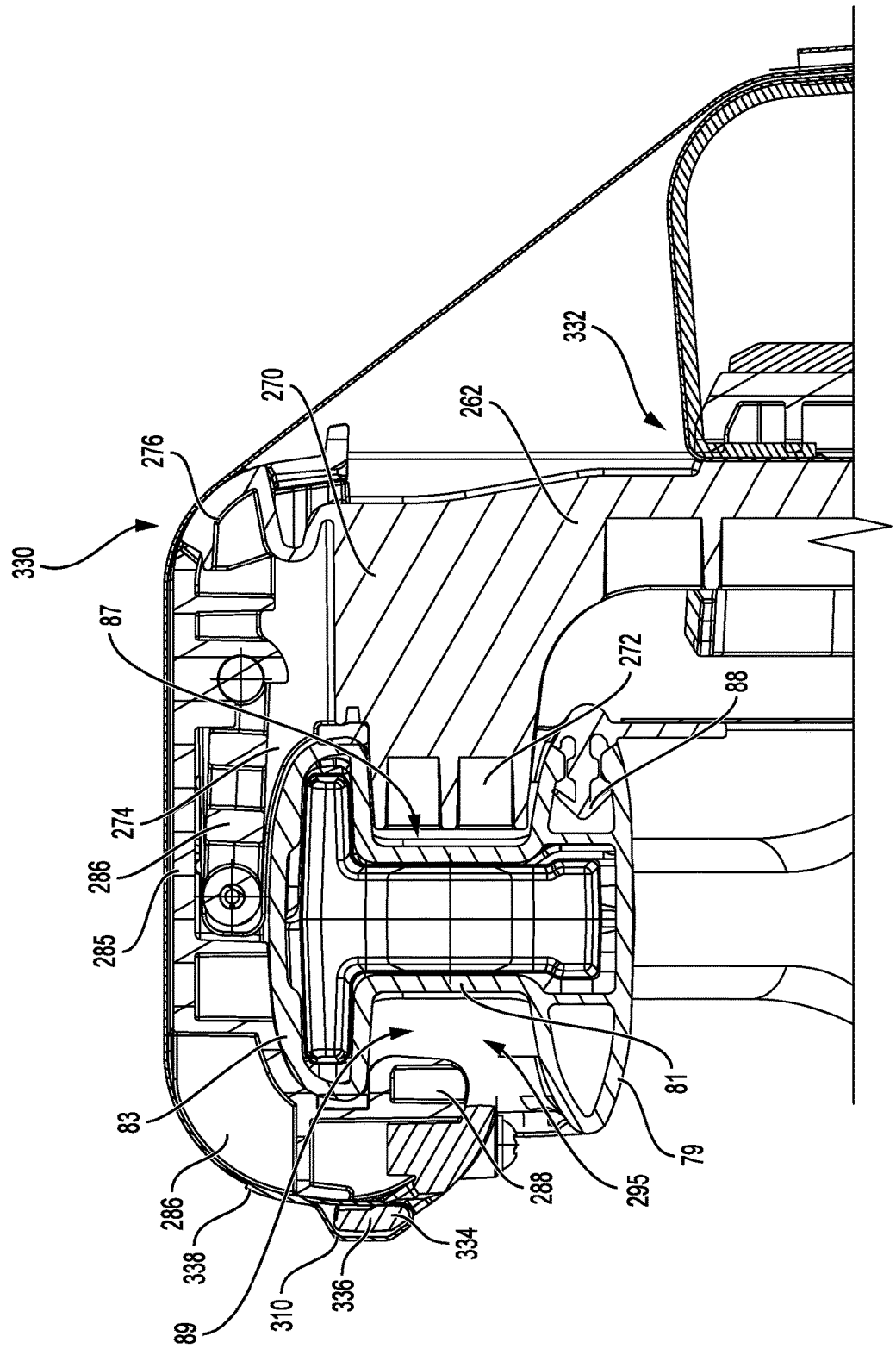
FIG. 16 is a detailed view of part of the cross-section of FIG. 15.

As shown in FIGS. 15 and 16, in the locked position of the locking member 264, the fixed member 262 and the locking members 264, together, form a shape that interlocks with a shape of the cross-sectional profile of the upper rail 74. In particular, the fixed member 262 and the locking member 264 together define a recess 295 (best shown in FIG. 16) that has generally the same shape as the cross-sectional profile of the wide upper portion 79 of the upper rail 74. As such, in the locked position of the locking member 264, the fixed member 262 and the locking member 264 together surround a majority of the wide upper portion 79 of the cross-sectional profile of the upper rail 74 (at the portion of the upper rail 74 to which the locking assembly 260 is locked onto). Notably, the shape formed by the fixed member 262 and the locking member 264 interlocks with the wide upper portion 79 and thus securely retains the board holder 200 with the barrier structure 50.

It is contemplated that the connectors 208, 210 could be configured differently in other embodiments. Moreover, in some cases, a single one of the connectors 208, 210 may be provided. For instance, in some cases, only the upper connector 208 may be provided.

While in this embodiment, the board holder 200 is configured to be connected to the barrier structure 50 of the boat 10, it is contemplated that, in other embodiments, the board holder 200 may be configured to be connected to another connecting structure of the boat 10. For instance, in some embodiments, the board holder 200 could be connected to a wake tower of the boat 10. Moreover, the board holder 200 may be secured in a different orientation to the boat 10.

Figure 17:
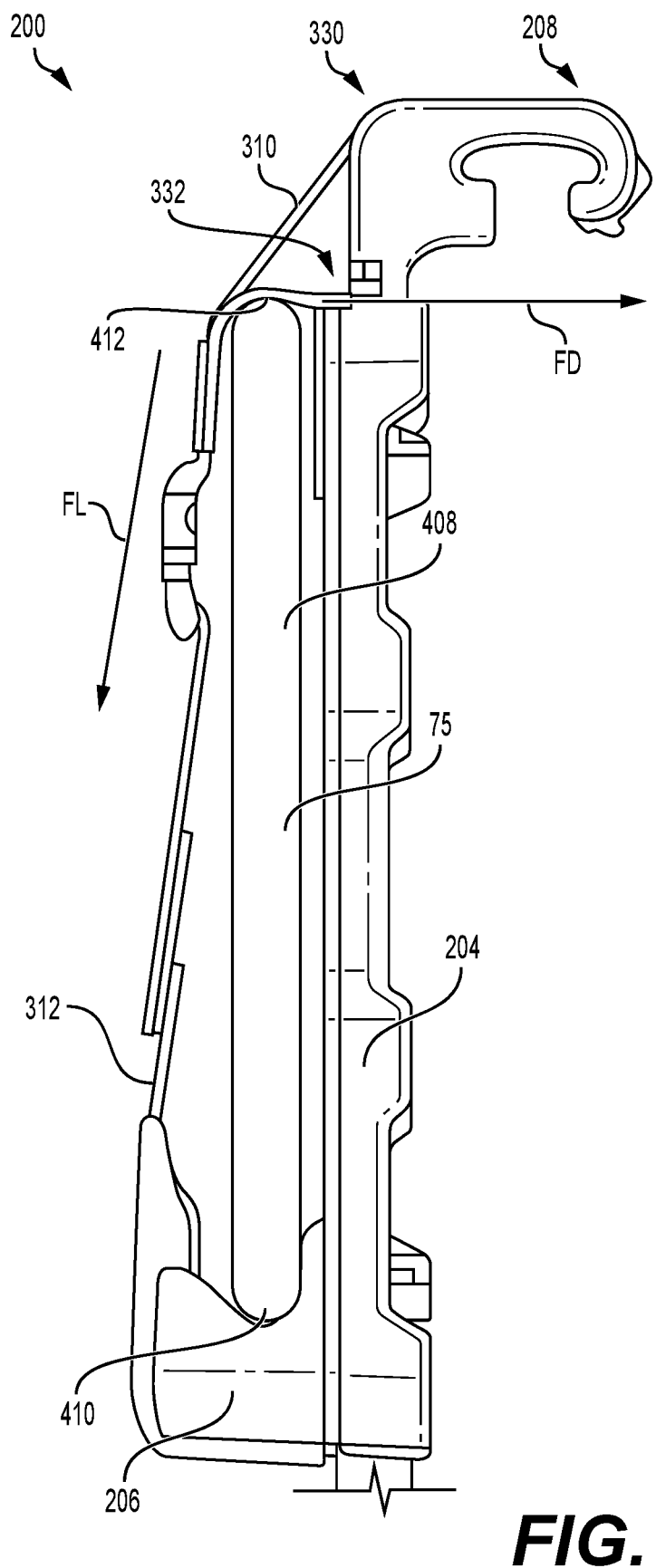
FIG. 17 is a rear elevation view of part of the board holder of FIG. 4 shown with a first marine board secured thereto.

Returning now to FIGS. 7 to 10, the body 202 also includes a board support 206 that is connected to the main body portion 204 and is configured to receive and support a lateral side 410 (FIG. 17) of the marine board 75 that is stored on the board holder 200. As shown in FIG. 17, the lateral side 410 of the marine board 75 is opposite another lateral side 412 thereof which together define a "width" of the marine board 75 (in the frame of reference of the marine board 75 itself during its use). In this embodiment, the board support 106 is made separately from the main body portion 204 and fastened thereto by fasteners 207 (FIG. 8). It is contemplated that, in other embodiments, the board support 206 could be connected to the main body portion 204 by being made integrally therewith such that the main body portion 204 and the board support 206 form a single piece component. As can be seen, in this embodiment, the board support 206 is disposed at a lower end of the main body portion 204. Moreover, the board support 206 is wider than a remainder of the body 202 in order to provide a wider support base for the marine board 75. Notably, the board support 206 has opposite width ends 212, 214 spaced apart from one another in a width direction WD of the board holder 200 perpendicular to the length direction LD and defining a width of the board support 206 therebetween. The width ends 212, 214 are configured to receive the lateral side of the marine board 75. In particular, in this embodiment, the board support 206 has opposite forked portions 217 for engaging the marine board 75, each of the forked portions 217 defining a respective one of the width ends 212, 214. Each forked portion 217 defines a generally V-shaped recess 219 for receiving the lateral side of the marine board 75. That is, a thickness of the marine board 75 is received in the recess 219 between two fork arms of the each forked portion 217. In this embodiment, the forked portions 217 comprise an elastomeric material to provide protective and high friction contact and with the surfaces of the marine board 75. A central portion 302 of the board support 206 is disposed between the forked portions 217 in the width direction WD.

As best shown in FIGS. 7 and 8, an inner side 215 of the board support 206 that is configured to support the lateral side of the marine board 75 has a shape that is generally concave to accommodate the curved lateral side of the marine board 75. Notably, a midpoint 216 (FIG. 12) of the central portion 302 on the inner side 215 centered between the first and second width ends 212, 214 is distanced, in the length direction LD, further from the upper end of the main body portion 204 than the width ends 212, 214. In other words, a distance between the midpoint 216 and the lower end of the main body portion 204 is less than a distance between either of the first and second width ends 212, 214 and the lower end of the main body portion 204.

Furthermore, as shown in FIGS. 7 and 8, in this embodiment, the board support 206 also has a limiting flange 304 extending upwardly from the central portion 302. The limiting flange 304 helps maintain the marine board 75 in place, notably by functioning as a stopper on a side of the marine board 75 opposite the main body portion 204. In particular, the limiting flange 304 is spaced from the main body portion 204 in a depth direction DD (FIG. 10) that is perpendicular to both the length and width directions LD, WD. Notably, in use, the marine board 75 is disposed between the limiting flange 304 and the main body portion 204 in the depth direction DD. An inner side 305 of the limiting flange 304 facing the main body portion 204 is provided with a gripping member 306 connected to the limiting flange 304. The gripping member 306 is configured to grip a surface of the marine board 75. To that end, in this embodiment, the gripping member 306 is made of an elastomeric material (e.g., rubber). Furthermore, as shown in FIG. 12, the gripping member 306 has a plurality of ridges 307 to further improve gripping of the marine board 75.

As best shown in FIGS. 7, 8, 12 and 13, in this embodiment, a plurality of protective elements 325 is connected to the main body portion 204 on a board-facing side 213 (opposite the back side 209) thereof. In use, the board-facing side 213 of the main body portion 204 faces the marine board 75. The protective elements 325 are made of an elastomeric material (e.g., rubber) to provide protective contact with the marine board 75.

In order to secure the marine board 75 to the board holder 200, the board holder 200 has upper and lower straps 310, 312 which are fixed to the body 202 to securely hold the marine board 75 in place as will be described in more detail below. In particular, in this embodiment, the lower strap 312 is fixed to the body 202 near the board support 206. More specifically, as shown in FIG. 12, the lower strap 312 is fixed to the main body portion 204 near the lower end thereof at a location aligned with the board support 206 in the length direction LD. Notably, in this example, the lower strap 312 wraps around an underside of the board support 206 and extends on a back side 209 of the main body portion 204 such that a fixed end 315 of the lower strap 312 is disposed on the back side 209. In particular, the fixed end 315 of the lower strap 312 is disposed between the fixed member 240 of the lower connector 210 and the main body portion 204, with one of the fasteners 242 that fastens the fixed member 240 to the main body portion 204 fixing the fixed end 315 in place. It is contemplated that, in other embodiments, the lower strap 312 could be fixed to main body portion 204 at another location thereof or to the board support 206.

Figure 12:
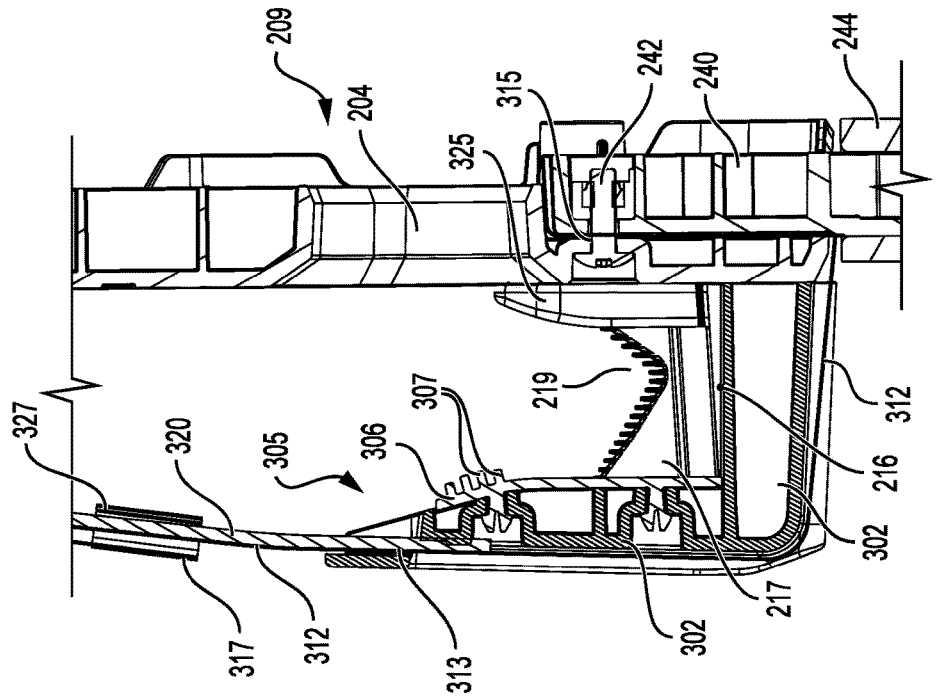
FIG. 12 is a detailed view of part of the cross-section of FIG. 11.

As shown in FIGS. 7 and 12, starting from the fixed end 315 of the lower strap 312, the lower strap 312 wraps around the underside of the board support 206 and is held against an outer surface of the limiting flange 304 that is generally perpendicular to the underside of the board support 206. The lower strap 312 is thus fixed at the board support 206. The lower strap 312 then traverses through an aperture 313 defined at an upper end of the limiting flange 304. In this embodiment, as shown in FIG. 12, at its exit from the aperture 313, a padding element 320 is fixed to the lower strap 312 along a portion thereof. The padding element 320 is made of a soft material (e.g., foam) to provide protective contact between the lower strap 312 and the surfaces of the marine board 75.

With reference to FIG. 13, at a location of the lower strap 312 at which the lower strap 312 has traversed the aperture 313, a lower fastener 316 is adjustably fixed to the lower strap 312 for adjusting and fixing a position of the lower fastener 316 along the length of the lower strap 312. That is, the lower fastener 316 is movable along the length of the lower strap 312, between a free end 317 of the lower strap 312 and the upper end of the limiting flange 304, and fixable in place along a selected position of the length of the lower strap 312. Notably, this fixability of the lower fastener 316 along the length of the lower strap 312 contributes to the board holder 200 being adjustable to store the marine boards 75 of different sizes.

With reference to FIGS. 13 and 14, in this embodiment, the lower fastener 316 is a male buckle portion having a bar 322 (best shown in FIG. 13) about which the lower strap 312 is wrapped, a cam portion 324 for fixing the lower fastener 316 in place relative to the strap 312, and a male attachment feature 326 for engaging a corresponding female attachment feature. As shown in FIG. 13, the cam portion 324 impinges on the lower strap 312 to fix the lower fastener 316 at a desired position relative to the lower strap 312. In order to move the lower fastener 316 along the length of the lower strap 312, the lower strap 312 is purposefully set at an angle at which the cam portion 324 no longer impinges on the lower strap 312. In this embodiment, the male attachment feature 326 includes three prongs 328 (one of which is partially shown in FIG. 14). Different configurations of the lower fastener 316 are contemplated. In this embodiment, as shown in FIG. 12, an optional strap loop 327 is provided to wrap about the free end 317 of the lower strap 312 to prevent the free end 317 from hanging loose.

With reference now to FIGS. 11 and 13, the upper strap 310 is fixed to the inner end portion 286 of the upper connector 208 via a strap receiving member 334 that is fixed to the inner end portion 286. The strap receiving member 334 defines an aperture 335 through which the upper strap 310 is inserted. The upper strap 310 loops about a bar 336 of the strap receiving member 334. Notably, an upper fixed end 338 of the upper strap 310 is welded (e.g., ultrasonically welded), sewn or otherwise fixed to another portion of the upper strap 310 to form a loop 337 about the bar 336 which cannot be disengaged from the strap receiving member 334.

The upper strap 310 is also fixed to the main body portion 204 by one of the fasteners 311. In particular, a lower fixed end 340 of the upper strap 310 wraps about the upper end of the main body portion 204 and is fixed between the main body portion 204 and the fixed member 262 of the upper connector 208.

Returning now to FIGS. 13 and 14, an upper fastener 342 is freely movable along a length of the upper strap 310. In other words, the upper fastener 342 is not fixed along the length of the upper strap 310 as, unlike the lower fastener 316 and the lower strap 312, the upper fastener 342 does not impinge on the upper strap 310 to fix its position along the length of the upper strap 310. The upper fastener 342 is configured to be complementarily mated with the lower fastener 316 in order to secure the marine board 75 in place on the board holder 200. In this embodiment, the upper fastener 342 is a female buckle portion having a bar 344 (best shown in FIG. 13) about which the upper strap 310 is wrapped, and a female attachment feature 346 for engaging the male attachment feature 326 of the lower fastener 316. In this embodiment, the female attachment feature 346 is a recess configured to receive the attachment prongs 328 of the lower fastener 316. In particular, the upper fastener 342 is shaped and dimensioned such that, when the recess 346 receives the attachment prongs 328, the lower fastener 316 lockingly engages the upper fastener 342. As such, in this embodiment, the fastener 316, 342 together form a side-release buckle. Different configurations of the upper fastener 342 are contemplated.

It is contemplated that the fasteners 316, 342 could be fasteners other than buckle portions in other embodiments. For example, the fasteners 316, 342 could be implemented as complementary snap buttons, or hook and loop fasteners or other suitable types of fasteners in other embodiments.

In this embodiment, as shown in FIGS. 13 and 14, an optional strap loop 347 is provided to wrap about two adjacent parts of the upper strap 310 in order to prevent the two adjacent parts from diverging from one another at the location of the strap loop 347. In addition, on this embodiment, as shown in FIG. 13, a padding element 321 is fixed to the upper strap 310 along a portion thereof. The padding element 321 is made of a soft material (e.g., foam) to provide protective contact between the upper strap 310 and the surfaces of the marine board 75.

As will be understood from the above, the upper strap 310 is fixed at two different locations of the body 202 that are offset from one another in the length direction LD. This contributes in the adaptability of the board holder 200 to store marine boards 75 of different sizes and shapes. In this embodiment, when the marine board 75 is secured on the board holder 200, the upper strap 310 is fixed from the fixed end 338 to an upper location 330 at the upper connector 208 and, from the fixed end 340 to a lower location 332 at the upper end of the main body portion 204. Thus, both the upper location 330 and the lower location 332 are spaced from the board support 206 in the length direction LD. As will be understood, the lower location 332 is disposed, in the length direction LD, between the upper location 330 and the board support 206. Moreover, in this embodiment, the upper and lower locations 330, 332 at which the upper strap 310 is fixed against the body 202 are generally aligned with one another in the width direction WD. Notably, the upper and lower locations 330, 332 are generally centered in the width direction WD.

The manner in which the marine board 75 is stored on the board holder 200 will now be described in greater detail with reference to FIG. 17. First, the lower fastener 316 and the upper fastener 342 are placed in an unfastened configuration (not shown) in which the lower and upper fasteners 316, 342 are disconnected from one another. With the lower and upper fasteners 316, 342 disconnected from one another, the lateral side 410 of the marine board 75 is placed on the board support 206. As will be appreciated, when the lateral side 410 of the marine board 75 is placed on the board support 206, the opposite lateral sides 410, 412 of the marine board 75 are spaced apart from one another in the length direction LD of the board holder 200. Next, the fasteners 316, 342 are mated with one another. As can be seen, once the lower and upper fasteners 316, 342 are mated with one another, the upper strap 310 is positioned to partly wrap about the lateral side 412 of the marine board 75 in order to secure the marine board 75 in place on the board holder 200. If not already previously done, the lower fastener 316 is adjusted by the user in the manner described above to set the adequate position of the lower fastener 316 along the length for the lower strap 312 to ensure that the straps 310, 312 are sufficiently taught to secure the marine board 75. It is understood that the adequate position of the lower fastener 316 will depend on the dimensions of the marine board 75, namely on the width of the marine board 75 as defined between the opposite lateral sides 410, 412 thereof. As can be seen in FIG. 17, the upper strap 310 is fixed to the body 202 at the upper and lower locations 330, 332 to limit movement of the lateral side 412 of the marine board 75. In particular, the upper strap 310 limits movement of the lateral side 412 of the marine board 75 in the length direction LD (i.e., vertically in this particular orientation of the board holder 200) by exercising a generally lengthwise force FL and in the depth direction DD by exercising a depthwise force FD. In particular, in use, in response to the fasteners 316, 342 mating with one another, a first portion of the upper strap 310 extending between the upper location 330 and the upper fastener 342 extends over the lateral side 412 of the marine board 75, and a second portion of the upper strap 310 extending between the lower location 332 and the upper fastener 342 extends over the lateral side 412 of the marine board 75, the second portion of the upper strap 310 being disposed between the first portion of the upper strap 310 and the lateral side 412 of the marine board 75 in the length direction LD of the body 202.

Figure 18:
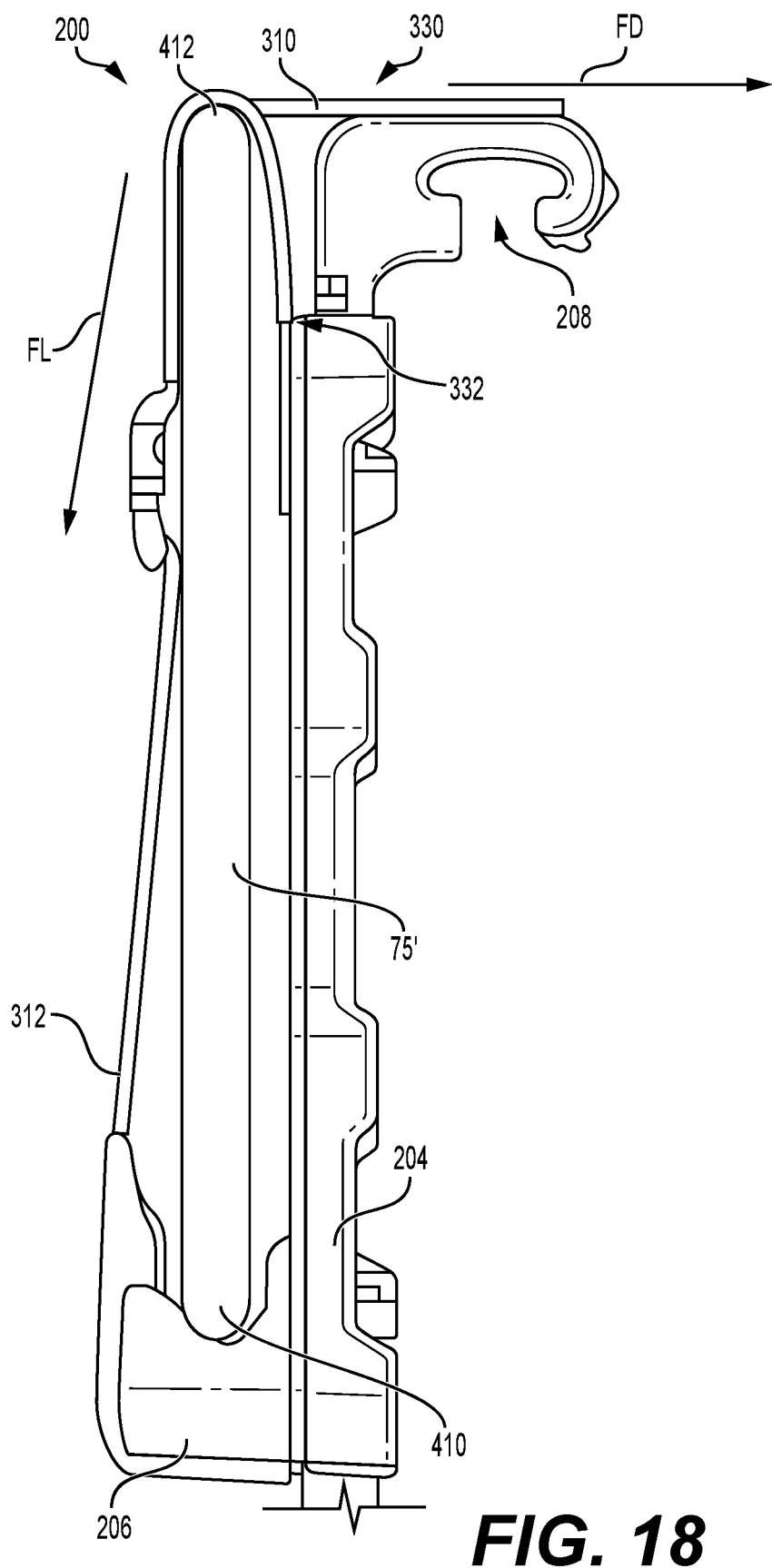
FIG. 18 is a rear elevation view of part of the board holder of FIG. 4 shown with a second marine board secured thereto.

Referring now to FIG. 18, as will be appreciated, the board holder 200 is adaptable to a different marine board 75' having different dimensions and/or shape from the marine board 75 illustrated in FIG. 17. Notably, in this example, the marine board 75' has a greater width defined between its opposite lateral sides 410, 412. The marine board 75' may also have a different thickness (i.e., its dimension in the depth direction DD of the board holder 200) than the marine board 75. As can be seen, the adjustability provided by the fasteners 316, 342 and the provision of the two vertically offset locations 330, 332 at which the upper strap 310 is fixed against the body 202, allows the board holder 200 to securely retain the bigger marine board 75 in the same manner via the lengthwise and depthwise FL, FD forces exerted at the lateral side 412 of the marine board 75'. The board holder 200 thus provides a simple and cost-effective manner in which to securely store a marine board and also allows differently sized and shaped marine boards to be stored thereon.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A board holder for storing a marine board, comprising:
   a body extending in a length direction and having a width direction perpendicular to the length direction, the body comprising a board support configured to receive and support a first lateral side of the marine board such that, in use, the first lateral side and a second lateral side of the marine board are spaced from one another in the length direction of the body;
   a first strap fixed to the body at or near the board support;
   a first fastener adjustably fixed to the first strap for adjusting and fixing a position of the first fastener along a length of the first strap;
   a second strap fixed to the body at:
     a first location spaced from the board support in the length direction; and
     a second location disposed, in the length direction, between the first location and the board support; and
   a second fastener freely movable along a length of the second strap, the second fastener being configured to be complementarily mated with the first fastener,
   in response to the first fastener and the second fastener mating with one another, the second strap being positioned to at least partly wrap about the second lateral side of the marine board to secure the marine board in place on the board holder.

2. The board holder of claim 1, wherein:
   the board support has an inner side configured to support the first lateral side of the marine board; and
   a shape of the inner side is generally concave.

3. The board holder of claim 1, wherein the board support is wider than a remainder of the body.

4. The board holder of claim 1, wherein the board support comprises:
   a first width end;
   a second width end spaced from the first width end in the width direction; and
   a midpoint centered between the first width end and the second width end,
   in the length direction of the body, a distance between the midpoint and the first location being greater than a distance between the first and second width ends and the first location.

5. The board holder of claim 4, wherein each of the first and second width ends of the board support defines a generally V-shaped recess.

6. The board holder of claim 1, wherein a point at which the first strap is fixed to the body is generally aligned with the first location and the second location in the width direction.

7. The board holder of claim 1, wherein:
   the first strap has a first strap end and a second strap end;
   the first strap end is fixed to the body; and
   the second strap end is free when the first and second fasteners are disconnected from one another.

8. The board holder of claim 1, wherein:
   the body comprises a main body portion extending at least in part between the second location and the board support, the board support being connected to the main body portion;
   the main body portion has a board-facing side configured to face the marine board when the marine board is secured to the board holder; and
   the board holder further comprises at least one protective element connected to the main body portion on the board-facing side thereof, the at least one protective element being made of an elastomeric material to provide protective contact with the marine board.

9. The board holder of claim 1, wherein:
   the first fastener is one of a male fastener and a female fastener; and
   the second fastener is an other one of the male fastener and the female fastener.

10. The board holder of claim 1, wherein the first fastener and the second fastener together form a buckle.

11. The board holder of claim 1, wherein the board holder comprises at least one connector for selectively connecting the board holder to part of a watercraft.

12. The board holder of claim 11, wherein the at least one connector is configured to be connected to a handrail of the watercraft.

13. The board holder of claim 1, wherein, in use, when the marine board is secured to the board holder, the second strap limits movement of the second lateral side of the marine board in a depth direction of the board holder, the depth direction being perpendicular to the length and width directions.

14. The board holder of claim 1, wherein, in use, in response to the first fastener and the second fastener mating with one another:
   a first portion of the second strap extending between the first location and the second fastener extends over the second lateral side of the marine board; and
   a second portion of the second strap extending between the second location and the second fastener extends over the second lateral side of the marine board, the second portion of the second strap being disposed between the first portion of the second strap and the second lateral side of the marine board in the length direction of the body.

15. A watercraft comprising:
   a deck;
   a hull supported by the deck;
   a connecting structure for connecting accessories to the watercraft; and
   the board holder of claim 1, the board holder being connected to the connecting structure of the watercraft.

16. The watercraft of claim 15, wherein the connecting structure is a barrier structure surrounding at least part of the deck.

17. The watercraft of claim 16, wherein the barrier structure comprises a handrail, the board holder being connected to the handrail.

* * * * *